US006975733B1

(12) United States Patent
Choi et al.

(10) Patent No.: US 6,975,733 B1
(45) Date of Patent: Dec. 13, 2005

(54) WATERMARKING OF DIGITAL IMAGES USING WAVELET AND DISCRETE COSINE TRANSFORMS

(75) Inventors: Jong Uk Choi, Seoul (KR); Jong Won Kim, Taejeon (KR); Jung Suck Cho, Seoul (KR); Han Ho Lee, Seoul (KR)

(73) Assignee: Markany, Inc., Seoul (KR)

( * ) Notice: Subject to any disclaimer, the term of this patent is extended or adjusted under 35 U.S.C. 154(b) by 0 days.

(21) Appl. No.: 09/786,823

(22) PCT Filed: Sep. 10, 1999

(86) PCT No.: PCT/US99/20649

§ 371 (c)(1),
(2), (4) Date: Apr. 19, 2001

(87) PCT Pub. No.: WO00/16516

PCT Pub. Date: Mar. 23, 2000

(51) Int. Cl.[7] ................................................ G06K 9/00
(52) U.S. Cl. ...................................................... 381/100
(58) Field of Search ................................ 382/100, 232, 382/248, 250, 280, 284; 386/94; 375/72, 375/73, 74, 81, 240.19, 240.2; 348/460; 705/57, 705/58; 358/3.28; 380/54, 55

(56) References Cited

U.S. PATENT DOCUMENTS

| | | | | |
|---|---|---|---|---|
| 4,564,915 | A | 1/1986 | Evans et al. | 345/550 |
| 6,128,413 | A * | 10/2000 | Benamara | 382/251 |
| 6,226,387 | B1 * | 5/2001 | Tewfik et al. | 382/100 |
| 6,240,121 | B1 * | 5/2001 | Senoh | 375/130 |
| 6,434,253 | B1 * | 8/2002 | Hayashi et al. | 382/100 |
| 6,510,233 | B1 * | 1/2003 | Nakano | 382/100 |
| 6,556,689 | B1 * | 4/2003 | Xia et al. | 382/100 |

FOREIGN PATENT DOCUMENTS

| | | | |
|---|---|---|---|
| WO | WO 99/63443 | * 12/1999 | G06F 12/14 |
| WO | WO 00/59148 | * 10/2000 | H04L 9/00 |

OTHER PUBLICATIONS

Piva, A. et al. "DCT-based Watermark Recovering Without Resorting to the Uncorrupted Original Image," IEEE 1997, pp. 520-523.
Ruanaidh, J. et al. "Rotation, Scale, and Translation Invariant Digital Image Watermarking," IEEE 1997, pp. 536-539.
Wolfgang, R. et al. "A Watermark For Digital Images," IEEE 1996 proc. International Conference on Image Processing, pp.. 219-222.
Van Schyndel, R. et al. "A Digital Watermark," IEEE Proc. ICIP-1994, vol. 2, pp. 86-90.

(Continued)

*Primary Examiner*—Andrew W. Johns
*Assistant Examiner*—Shervin Nakhjavan
(74) *Attorney, Agent, or Firm*—Senniger Powers

(57) ABSTRACT

The present invention relates to a method for embedding a watermark into a black and white or color digital image [D(x)]. Basically the inventive method comprises the steps of transforming the digital image using a wavelet transform [WC(y)], transforming a watermark using discrete cosine transform (DCT), integrating the wavelet-transformed digital image with the DCT-transformed watermark [DW(x)+WC(y)] to insert the watermark into the image, and generating the watermarked image using inverse wavelet transform [D(x)']. For color images, RGB mode is converted into YIQ mode using a conversion matrix and the wavelet transform is applied to the Y-, I-, Q-values. This inventive digital watermarking of a color image is found to be highly robust against lossy compression and other image processing operations, compared to conventionally known methods which are known to be unsuitable for watermarking color images.

13 Claims, 6 Drawing Sheets

OTHER PUBLICATIONS

Tang, W. "A DCT-based Coding of Images in Watermarking," IEEE Information, Communications and Signal Processing, Sep. 1997, (3 pages).

Wong, K. "Adaptive Water Marking," IEEE Transactions on Consumer Electronics, vol. 43, No. 4, Nov. 1997, pp. 1003-1009.

Hubbard, B. "The World According to Wavelets," A.K. Peters, Ltd., 1996, pp. 138-152.

Schneier, B. "Applied Cryptography," 2e John Wiley, 1996, pp. 9-10.

Inoue, H. et al: "A Digital Watermark Based on the Wavelet Transform and its Robustness on Image Compression," ICIP 98 Proc. 1998 International Conference on Image Processing, Jan. 1998, pp. 391-395.

Kundur, D. et al. "Digital Watermarking Using Multiresolution Wavelet Decomposition," ICIP 98 Proc. 1998 International Conference on Image Processing, vol. 5, pp. 2969-2972.

* cited by examiner

DISCRETE WAVELET TRANSFORM USING FILTERBANKS

INVERSE DISCRETE WAVELET TRANSFORM USING FILTERBANKS

WATERMARKING OF DIGITAL IMAGES USING WAVELET AND DISCRETE COSINE TRANSFORMS

This application is based on two Korean Patent applications, both filed on Sep. 10, 1998 at the Korean Intellectual Property Offices by the same inventors, wherein one of the two applications is entitled, *A Watermarking Process of Digital Image Using Wavelet Transform and Discrete Cosine Transform,* with a Korean Patent Application Serial Number 37273 (issued as Korean Patent No. 289365 on Feb. 19, 2001) and the other of the two applications is entitled, *A Digital Watermarking Process of a Color Image Using Wavelet Transform and Discrete Cosine Transform* with a Korean Patent Application Serial Number 37274 (issued as Korean Patent No. 285077 on Dec. 28, 2000).

TECHNICAL FIELD

The present invention relates to a method of watermarking of digital images in general, and in particular, to a method of embedding watermarks into digital images by using wavelet transform (WT) and discrete cosine transform (DCT) so that the impairment of the watermark during image processing operations, such as compression, filtering, cropping, re-scaling, resampling, rotation, and other manipulations is substantially avoided. The present invention is applied to both black and white image and color image.

BACKGROUND OF THE INVENTION

The advent of information communication technology is rapidly changing the form of data storage from an analog format to a high-quality digital format which is easily adaptable to further processing. The importance of digital information is increasing, especially in the area of computer graphics, digital library, cyber magazines and cyber space communications. Among various digital informations, text and still-picture information are widely traded in the virtual market through the Internet, which allow easy and extensive distribution of the information throughout the world. Transmission of audio and video information through the Internet is increasing at an exponential rate as the media for audio and video transmission proliferates.

However, there are problems associated with the rapid distribution and dissemination of the information. One of the problems are the proliferation of the unauthorized copying and illegal distribution of copyrighted digital material. This problem is compounded by the fact that the multimedia digital information of text, image, video, and sound can be easily mass-duplicated in exact copies.

Infringement of intellectual property rights by copying and distributing digital information in the virtual space is rapidly growing. Various protection measures are being developed to protect the intellectual property rights of the owners from unauthorized copying and distribution. Currently developed protection measures include encryption, digital watermarking, and system security. The present invention is concerned with watermarking of digital images.

Watermarking (or digital signature) is a method developed to protect information by embedding additional information into the original information to be protected. Watermarking may be classified into visible watermarking and invisible watermarking. (See J. J. K. Ruanaidh, F. M. Boland and O. Sinnen, 1996, "Watermarking Digital Images for Copyright Protection", EVA).

Visible watermarking adds copyright notice and information to the original information. It is illegal to remove the notice and illegal to copy without the author's permission. But preservation of the copyright notice and prevention against illegal copying is very difficult against infringement and illegal copying. Invisible watermarking designed to indicate ownership can prevent illegal erasure of the watermark by third parties without impairing the original information. But there is a problem of image distortion in the information produced by the conventionally available watermarking processes according to the known prior art. Thus, there is a compelling need for an improved watermarking method to overcome the foregoing and related problems.

Watermarking (or digital signature) is a method used to mark the proprietary ownership by means of copyright notice, logo or trademark and identify unauthorized copying and distribution of copyrighted material. The watermarking is accomplished by inserting "marks" which is not visible to the naked eye on the information sought to be protected. Extensive research has been underway in many industrialized countries around the world to provide an improved watermarking method. This research effort has been intensified for the following reasons. Enabled by the emerging digital technology increasingly various media, such as newspapers, magazines, library, electronic museum, video-on-demand, audio-on-demand, MP3, web site, TV, digital radio, and certification of public documents, crdit checking transaction, transmittal of monetary and security information, has gone digital. The digital technology is bringing a form of revolution and this is even further heightened by Internet, Internet TV, digital YV, MP3 and so on.

The technologies developed to date for watermarking include the spatial method, the frequency domain method, and the spread spectrum method. The spatial method has the advantage that the watermark can be added easily, but has the disadvantage in that the image or information being watermarked and the image itself is susceptible to distortion as it is subjected to lossy compression and filtering. (See G. C. Langelaar, J. C. A. van der Lubbe and J. Biemond, 1998, "Copy Protection for Multimedia Data based on Labeling Techniques"; H. Berghel, and L. O'GorMan, 1998, "Digital Watermarking"; Aura T., "Practical invisibility in digital communication", 1998; O. Bryndonckx, J.-J. Quisquater and B. Marcq, 1998, "Spatial Method for Copyright Labeling of Digital Images.")

The frequency domain method converts the digital data into the analog signals of frequency components, and inserting a watermark using various transform techniques, such as DCT, FFT or wavelet transforms. Although the watermark created by the frequency domain method is difficult to erase because it is distributed over the entire data, there is the problem of image distortion depending on the values of the coefficients. (See Peticolas, F. A. P., R. J. Anderson and M. G. Kuhn, 1998, "Attacks on copyright marking systems"; Cox, I. J., J. Kilian, T. Legithton and T. Shamoon, 1996, "Secure Spread Spectrum Watermarking for Images, Audio and Video", Proc. International Conference on Image Processing. ICIP '96. Vol. III. Pp. 243–246; Wolfgang, R. B. and E. J. Delp, 1996, "A Watermarking for Digital Images", proceedings of the 1996 International Conference on image processing, Lausanne, Switzerland, vol. 3, pp. 219–222; M. Ejima, A. Miyazaki, and T. Saito, 1998, "Digital Watermark based on the Dyadic Wavelet Transform and its Robustness on Image Compression", Proceedings of ITC-CSSSS '98, Sokcho, Korea, pp. 125–128).

The spread spectrum method which has become popular in recent years. Here the watermark is spread over the audio or the digital image during the DCT (discrete cosine transform) process based on the spread spectrum method. During this process, the spectrum is analyzed and n number of high coefficients, that is, the important portions of the spectrum, are modified. This method is similar, in part, to the frequency domain method. This method also utilizes the CDMA technique, in part, by spreading the watermark broadly. This method avoids impairment of the watermark somewhat in the transform processes, that is, in JPEG, copying, scanning, scaling compression/expansion processes. But this method causes the watermark to suffer in the data compression stage, that is, the watermark is considerably impaired in the data compression stage.

OBJECTS OF THE INVENTION

It is an object of the present invention to overcome the aforementioned shortcomings of the prior art watermarking methods and systems.

It is another object of the present invention to provide an improved watermarking method and system which makes it very difficult to erase or remove the watermarks.

It is yet another object of the present invention to provide a watermarking method which preserves and maintains the integrity of the watermark as it undergoes the image processing, such as image compression or cropping, dithering, color requantization or scaling compression and expansion, and the like.

It is yet another object of the invention to provide a watermarking method and system wherein the original image being watermarked remain intact as the invisible watermark is inserted into the original image.

It is still another object of the present invention to provide a method of digital watermarking which is robust against data, compression and filtering.

It is a further object of the present invention to provide improved watermarking method and system in color images.

It is yet another object of the present invention is to provide a method of digital watermarking that is not affected by compression processes, such as JPEG or MPEG.

SUMMARY OF THE INVENTION

The foregoing and other objects of the present invention are achieved by the present invention based on the use of a unique combination of two algorithms, namely, a wavelet transform (WT) and a discrete cosine transform (DCT). In accordance with the present invention, a watermark is embedded into a digital image by using wavelet transform and discrete cosine transform. The present inventive method is found to be effective against impairment of the watermark that would otherwise be caused by the image processing operations, such as compression, filtering and cropping.

The present invention comprises the steps of transforming the digital image using wavelet transform (WT), transforming a watermark using discrete cosine transform (DCT), integrating the wavelet-transformed digital image with the DCT-transformed watermark to insert the watermark into the image, and generating the watermarked image using inverse wavelet transform (See FIGS. 3 and 4).

In accordance with the present invention, a wavelet transform and a discrete cosine transform are applied to watermarking black and white images and color images.

DETAILED DESCRIPTION OF THE INVENTION

Figure 1A:
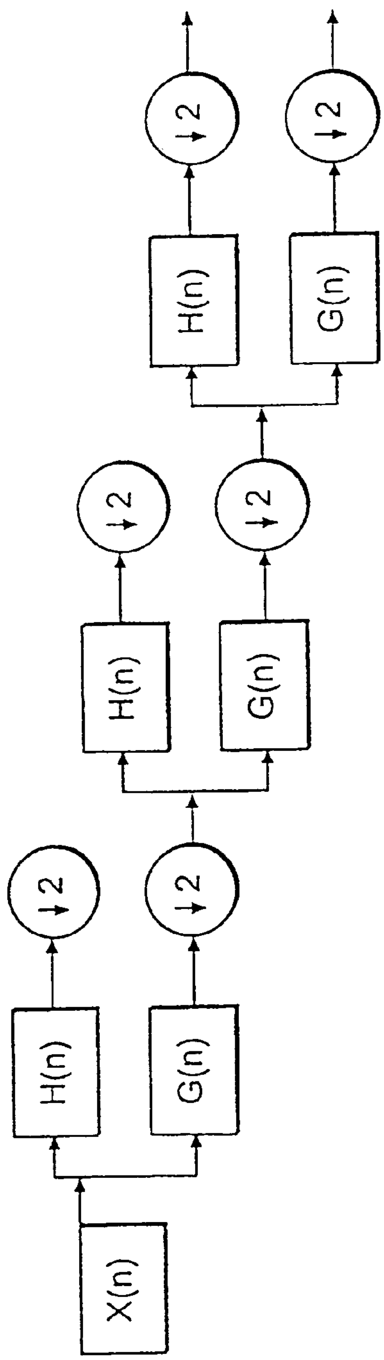
FIGS. 1A and 1B is a flow diagram showing discrete wavelet transform (WT) and inverse discrete wavelet transform (IWT).

According to the present invention, a watermarking method is provided which includes the following steps of transforming an original digital image using wavelet transform, transforming a black and white watermark using discrete cosine transform, integrating the wavelet-transformed digital image with the DCT-transformed watermark, and generating a watermark-embedded image.

A conventional method of making a watermark involves use a PRN (Pseudo Random Number) as a watermark to reduce the image distortion. In contrast, the present invention embeds a watermark of a general image, in facilitating the generation of a "mark.". The general image includes symbols such as photos, 2-D drawings, logo, trademark, emblems, seal-marks, and other graphic symbols.

The present invention is implemented in the hardware environment using an IBM PC Pentium MMX 166 and a scanner and in the software environment involving the use of Visual C++, readily available on the market. It is to be understood that the present inventive method can be implemented by computers made by various different manufacturers with the use of softwares written in any appropriate language.

In general, when a watermark is transformed, the original mark cannot be recognized in the transform plane. If a watermark of an impulse form is used, the transformed watermark is distributed over the entire transform plane. Fourier transform may be used, but the resulting complex coefficients in the transform plane are not easily combined with the image values.

In order to solve these problems, the present invention uses discrete cosing transform (DCT) to transform a watermark. While DCT has a similar characteristic as Fourier transform, DCT has an advantage of having only real values rather than complex numbers in the case of Fourier transform. The mathematical definition and theory of discrete cosine transform (DCT) are described below.

1. Discrete Cosine Transform (DCT)

DCT, having a close relationship with high speed FFT, is used to encode signals or images. DCT is widely used in the standard JPEG compression. One-dimensional DCT is defined as follows:

$$t(k) = c(k)\sum_{n=0}^{N-1} s(n)\cos\frac{\pi(2n+1)k}{2N},$$ [Equation 1a]

where s denotes the original coefficients, t denotes N number of transformed value, and c denotes the coefficients given as:

$$c(0)=\sqrt{1/N},\ c(k)=\sqrt{2/N}\ \text{for}\ 1 \leqq k \leqq N-1 \quad \text{[Equation 1b]}$$

As for a square matrix, two-dimension DCT is defined as follows:

$$t(i, j) = c(i, j)\sum_{n=0}^{N-1}\sum_{m=0}^{N-1} s(m, n)\cos\frac{\pi(2m+1)i}{2N}\cos\frac{\pi(2n+1)j}{2N} \quad \text{[Equation 2a]}$$

where N, s, and t denote the same as defined in the one-dimensional case, and c(i, j) is assigned as follows:

$$c(0, j) = \frac{1}{N},\ c(i, 0) = \frac{1}{N},\ c(i, j) = \frac{2}{N}\ \text{for}\ i \neq 0,\ j \neq 0 \quad \text{[Equation 2b]}$$

DCT can be inverse-transformed and can be defined for one-dimension and two-dimensions as follows:

$$s(n) = \sum_{k=0}^{N-1} c(k)t(k)\cos\frac{\pi(2n+1)k}{2N} \quad \text{[Equation 3a]}$$

$$s(m, n) = \sum_{i=0}^{N-1}\sum_{j=0}^{N-1} c(i, j)t(i, j)\cos\frac{\pi(2m+1)i}{2N}\cos\frac{\pi(2n+1)j}{2N} \quad \text{[Equation 3b]}$$

2. Discrete Wavelet Transform (DWT)

Figure 1B:
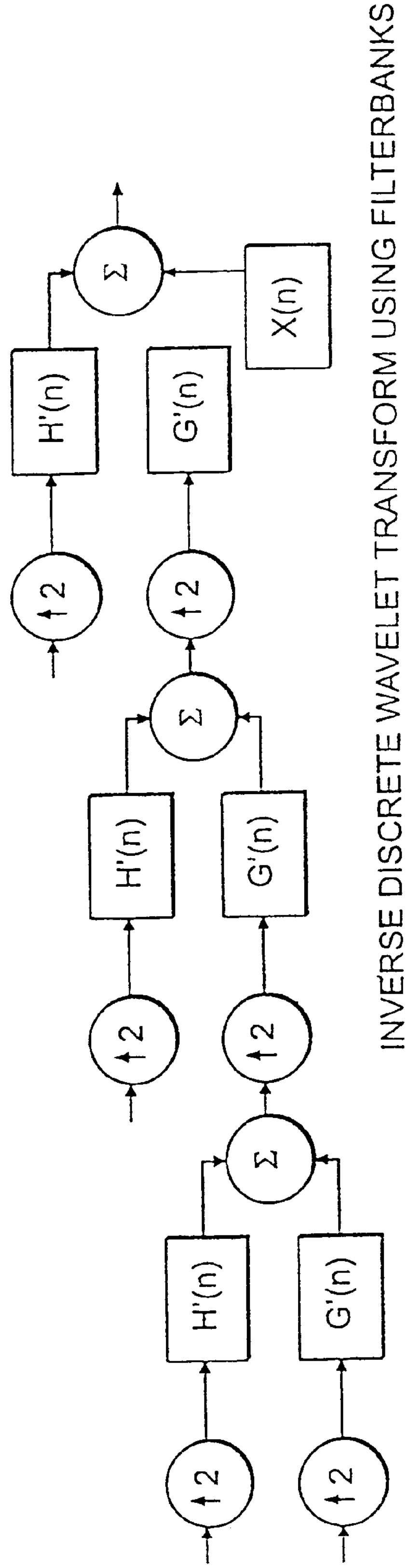
Figure 2:
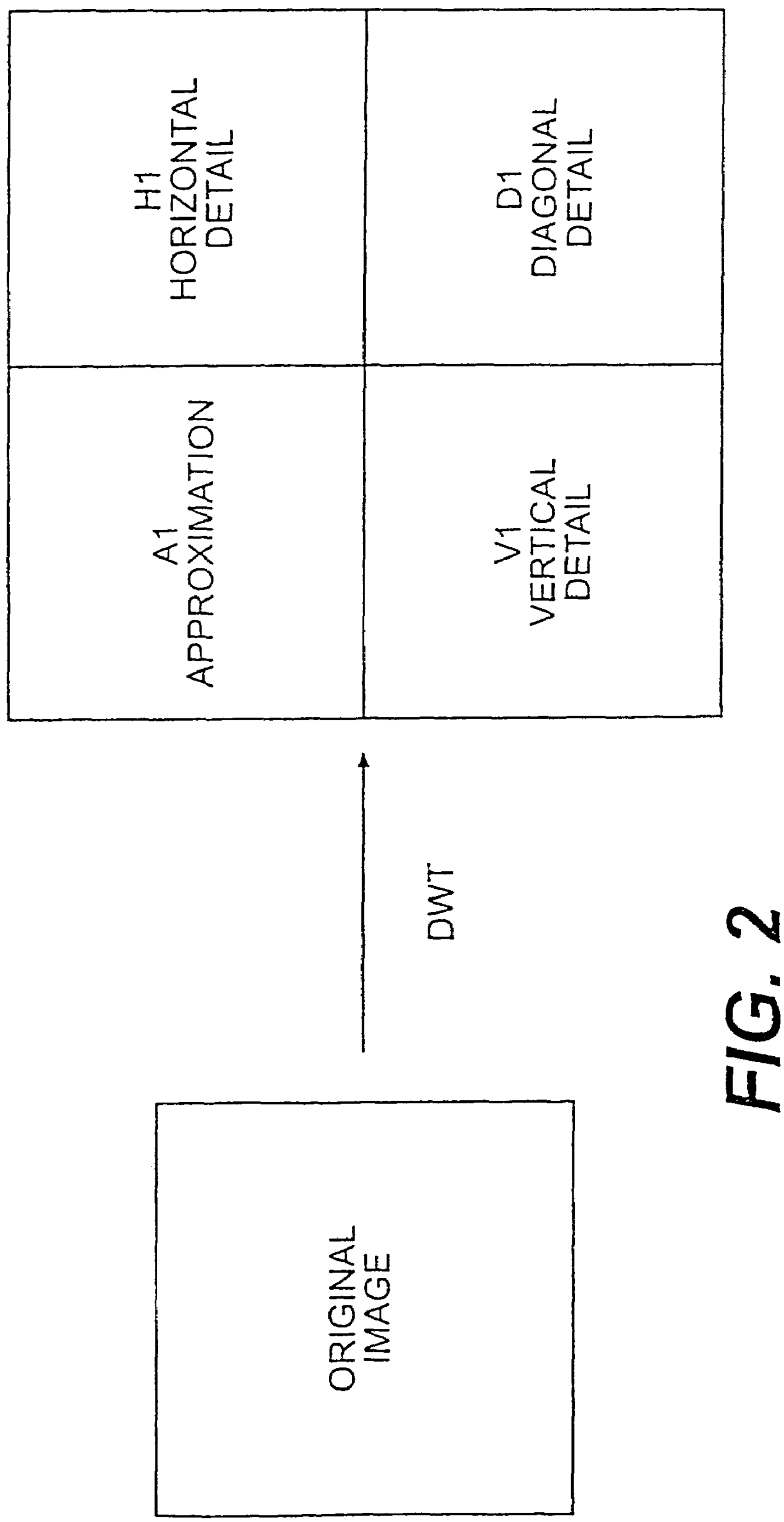
FIG. 2 is a diagram showing the distribution of coefficients.

In the present invention, a digital image is wavelet transformed (WT) before being integrated with a watermark transformed by DCT. Particularly, discrete wavelet transform is used, as illustrated in FIG. 2, which selects a set of wavelet coefficients with respect to scaling and transposition. Preferably, a filter bank that facilitates fast wavelet transform, as illustrated schematically in FIG. 1, is used. The mathematical definitions and theory of wavelet transform are described below.

While Fourier transform uses the sine and cosine functions as a basis function, wavelet transform (WT) uses wavelets as a basis function. There are two types of wavelet transform: continuous wavelet transform and discrete wavelet transform. Continuous wavelet transform is defined as follows:

$$W(s, \tau) = \int_{-\infty}^{\infty} f(t)\psi(s, t)\,dt \quad \because s\text{: Scaling, } \tau\text{: translation} \quad \text{(Equation 4]}$$

Scaling is related to frequency. Low scaling, i.e., compressed wavelet, extracts the high frequency components while high scaling, i.e., expanded wavelet, extracts the low frequency components.

Continuous wavelet transform cannot be realized in practice because there are infinite number of wavelet coefficients as a function of scaling and position translation. Thus, a more effective algorithm results, if discrete wavelet transform selecting certain number of subsets is used, as schematically illustrated in FIG. 2. However, since the discrete wavelet transform imposes a computational burden, it is preferable to use a filter bank realizing high-speed wavelet transform, as illustrated in FIG. 1. This method utilizes the classical 2-channel sub-band coding and the pyramid algorithm.

Figure 3:
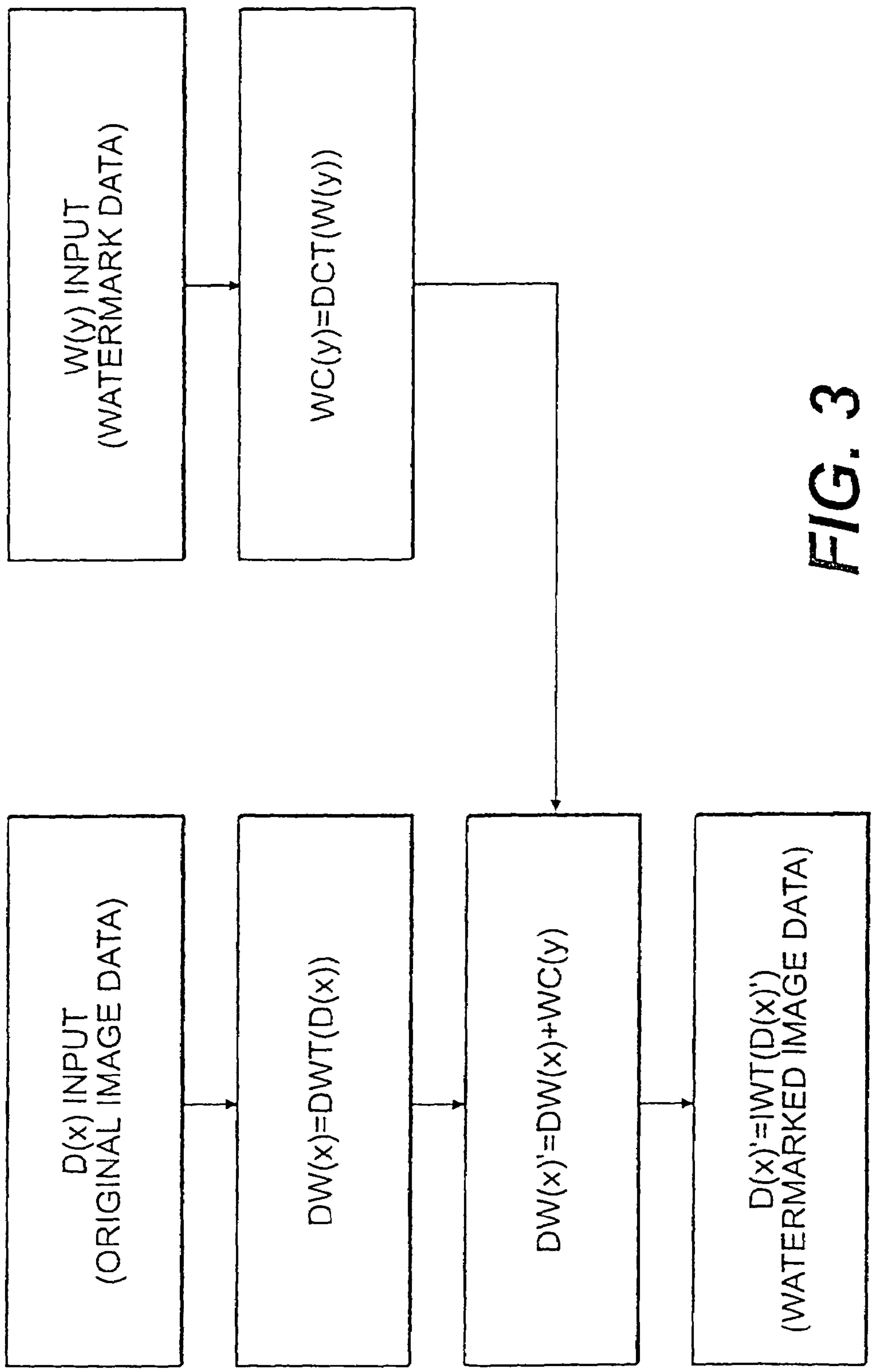
FIG. 3 is a flow diagram showing an embodiment of watermarking using wavelet transform and Discrete Cosine Transform (DCT).

Now the present invention of watermarking a digital image in black and white using wavelet transform (WT) and discrete cosine transform (DCT) will be described in detail with reference to the drawings. Referring to FIG. 3, which is illustrative flow diagram of an embodiment of the present, the watermarking method includes the following steps:

1), transforming an original (target) image D(x) in black and white using wavelet transform (WT);

2), transforming watermark data W(y) in black and white using discrete cosine transform (DCT);

3), integrating the wavelet transformed image DW(x) with DCT-transformed watermark WC(y);

4), generating D(x)' by transforming the integrated image DW(x)' using inverse wavelet transform; and 5), generating a watermark-embedded image D(x)'.

Figure 4:
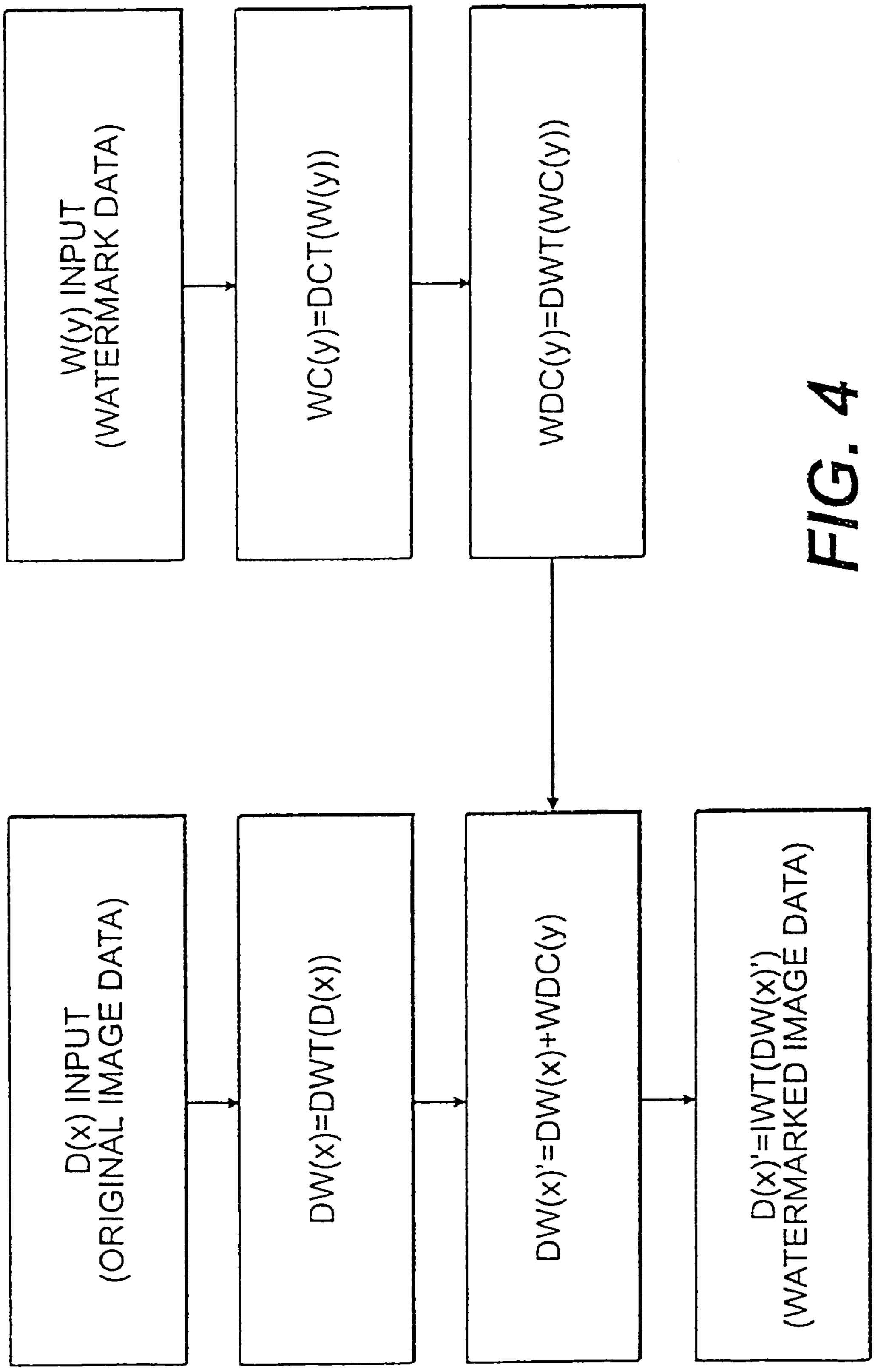
FIG. 4 is a flow diagram showing another embodiment of watermarking using WT and DCT.

A variation of the present inventive watermarking method is shown schematically in a flow chart in FIG. 4. According to this variation, the watermarking method includes the following steps of:

1), converting an original image D(x) in black and white;

2), transforming a watermark W(y) in black and white using DCT;

3), further transforming the DCT-transformed watermark WC(y) using m-level discrete wavelet transform;

4), integrating the wavelet transformed image DW(x) with m-level wavelet-transformed watermark WDC(y); and 5), generating a watermark-embedded image D(x)'.

When obtaining the image D(x)' integrated with a watermark W(y), a scaling parameter α is used to adjust the spacing between the original image D(x) and the watermark W(y). In accordance with the present invention, the following is used for easy conversion.

$$D(x)'_i = D(x)_i + \alpha W(y)_i \quad \text{[Equation 5]}$$

The software environment was provided by the C code using Visual C++. An IBM PC of Pentium class was used to perform necessary calculations. This specific environment is merely illustrative.

Performance Test of the Present Inventive Watermarking Method

Extensive tests were conducted to test the robustness of the watermarks embedded in accordance with the present invention against the JPEG compression, filtering resampling and cropping and other steps to which the method is subjected. Examples and results of the tests are summarized below. The final results were judged to assess the strength of the present watermarking method by analyzing the watermark before the extraction (W) and after the extraction (W') using correlation analysis. The correlation is defined as follows:

$$C(\text{Correlation}) = \frac{W(i, j)}{\sqrt{W(i, i) * W(j, j)}} \quad \text{[Equation 6]}$$

EXAMPLE 1

Evaluation of Watermark Preservation After Lossy Compression of Images

In general, images are compressed before being transmitted because uncompressed files such as a BMP file could be huge in size. Image compressions may be classified into lossy compressions and lossless compressions. Lossy compressions are widely used due to its high compression ratio despite minor degradation of the original image. JPEG is a representative example of a lossy compression. As mentioned above, since watermarks should be preserved after image processing, a watermarking method is commercially usable if no problem occurs after a lossy compression.

Accordingly, an experiment was conducted to test the preservation strength of watermarks by changing the Q factor of JPEG to 50%, 30%, 20%, and 10%. As a result, the watermark after 20% JPEG compression was clearly identified. The watermark after 10% JPEG compression was somewhat blurred, but was still visually identifiable.

EXAMPLE 2

Effect on Watermarks After Filtering of Images

Since images typically go through filtering to eliminate the noise, an experiment was conducted to find out the effect on watermarks after a low-pass filter and a median filter images. The test confirmed that the watermarks could be successfully extracted. The correlation of watermarks extracted is shown in Table 1.

TABLE I

| Filter Type | Low Pass Filter | Median Filter |
| --- | --- | --- |
| Correlation | 26.83% | 57.84% |

The result shows that the watermarks were not affected by filtering through the low-pass and median filter.

EXAMPLE 3

Effect on a Watermark After Resampling

An experiment was conducted to test a watermark generated according to the algorithm of the present invention after resampling, where resampling extinct the entire pixel values of an image. The correlation of an extracted watermark after losses of 3 bits, 4 bits, and 5 bits is shown in Table 2.

TABLE 2

| Loss of bits | 3 bits | 4 bits | 5 bits |
| --- | --- | --- | --- |
| Correlation | 18.81% | 37.62% | 72.99% |

The test shows that the extracted watermark could be clearly recognized after resampling.

EXAMPLE 4

Effect on a Watermark After Cropping of an Image Block

An experiment was conducted to measure how much of a watermark remains at the center of an image, the most essential part. An image block of 192×192 was cropped from the whole image, and the correlation was shown in

TABLE 3

| | |
| --- | --- |
| cropping Size | 192 × 192 |
| Correlation | 27.89% |

The result confirms that successful extraction of a watermark is possible after cropping of an image block.

EXAMPLE 5

Evaluation of the Digital Watermarking Algorithm

The watermark image used in evaluating the digital watermarking algorithm was an image with a particular letter. Since the image has the form of an impulse, it is expected that the values after DCT transform be widely distributed. This is a similar result found in spread spectrum techniques. Uniformly distributed watermarks can be generated by inverse wavelet transform of the DCT-transformed watermark. The successful nature of the present invention was demonstrated by an example according to the present invention showing the correlation of 99.85% between the watermark with the original image and by another example showing the correlation of 88.04%.

In summary, as shown above, the present invention of digital watermarking using wavelet transform and DCT has a superior effect of preserving watermarks after lossy compression or other image processing. Especially, extraction of a watermark was possible after lossy compression of JPEG using the Q factor of 50%, 30%, 20%, and 10%. Extraction of watermarks was possible after the images were subject to low-pass filtering or median filtering. Extraction of watermarks was also possible after resampling and cropping. In short, the watermarking method according to the present invention which uses a combination of the two algorithms, WT and DCT, is found superior to the conventional known method which uses DCT or wavelet transform (WT) alone in various aspects and especially in terms of preservation of the watermarks and the image being watermarked in the watermarking processes.

The present digital watermarking invention was used in watermarking color images. The use of the wavelet transform (WT) and discrete cosine transform (DCT) in watermarking color image will now be described in detail with reference to the FIGS. 5 and 6.

Figure 5:
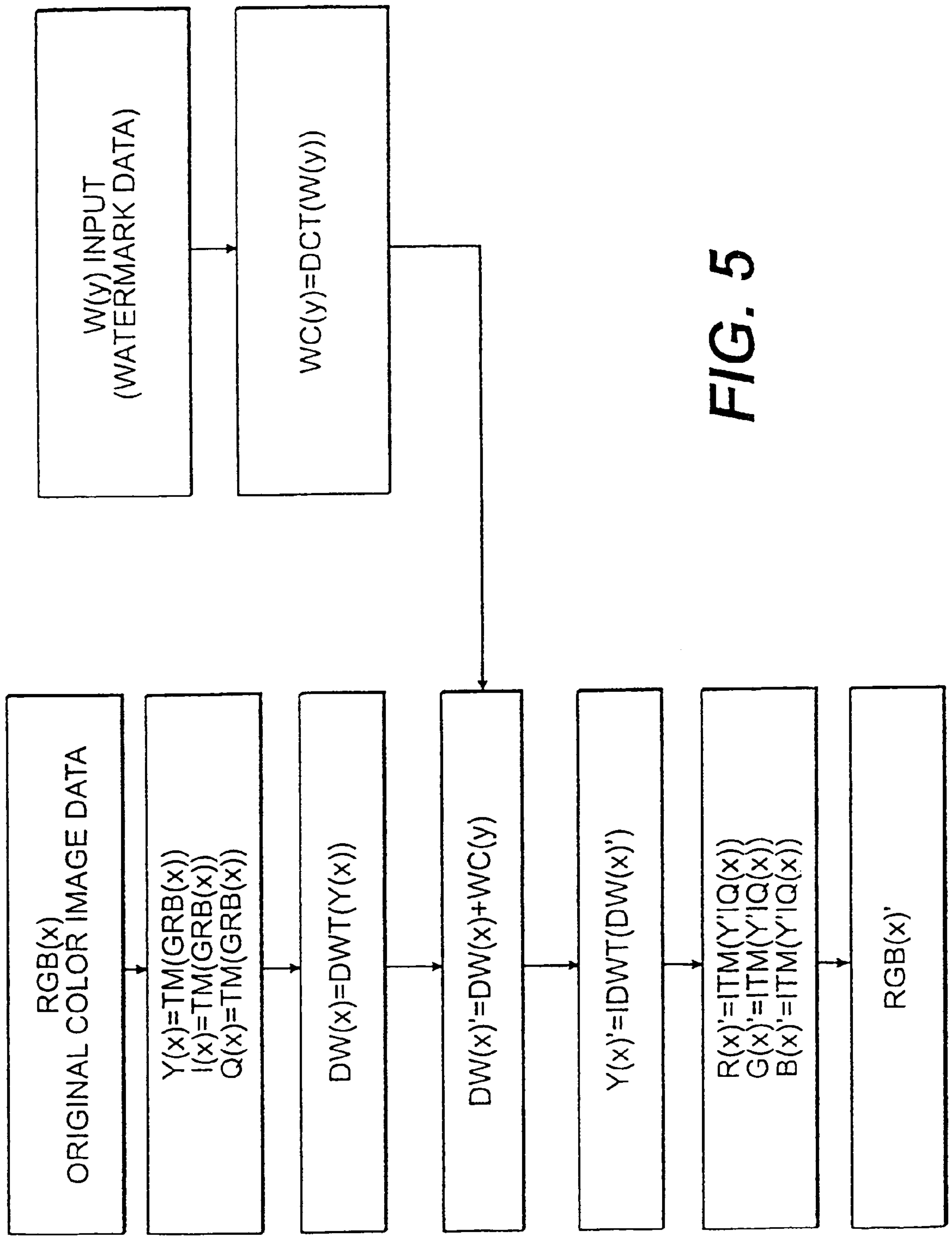
FIG. 5 is a diagram showing a digital watermarking process of a color image using WT and DCT.

Referring to FIG. 5, the method includes the following steps of:

1), converting the color image data in the RGB mode (RGB(x)) to Y(x), I(x), and Q(x) in the YIQ mode;

2), transforming the Y(x) using wavelet transform;

3), transforming watermark data W(y) in black and white using discrete cosine transform (DCT);

4), integrating the wavelet transformed color image DW(x) with DCT-transformed watermark WC(y);

5), generating Y(x)' by transforming the integrated image DW(x)' using inverse wavelet transformation; and 6), generating a watermark-embedded image RGB(x)' by converting the image in the YIQ mode to that in the RGB mode.

Figure 6:
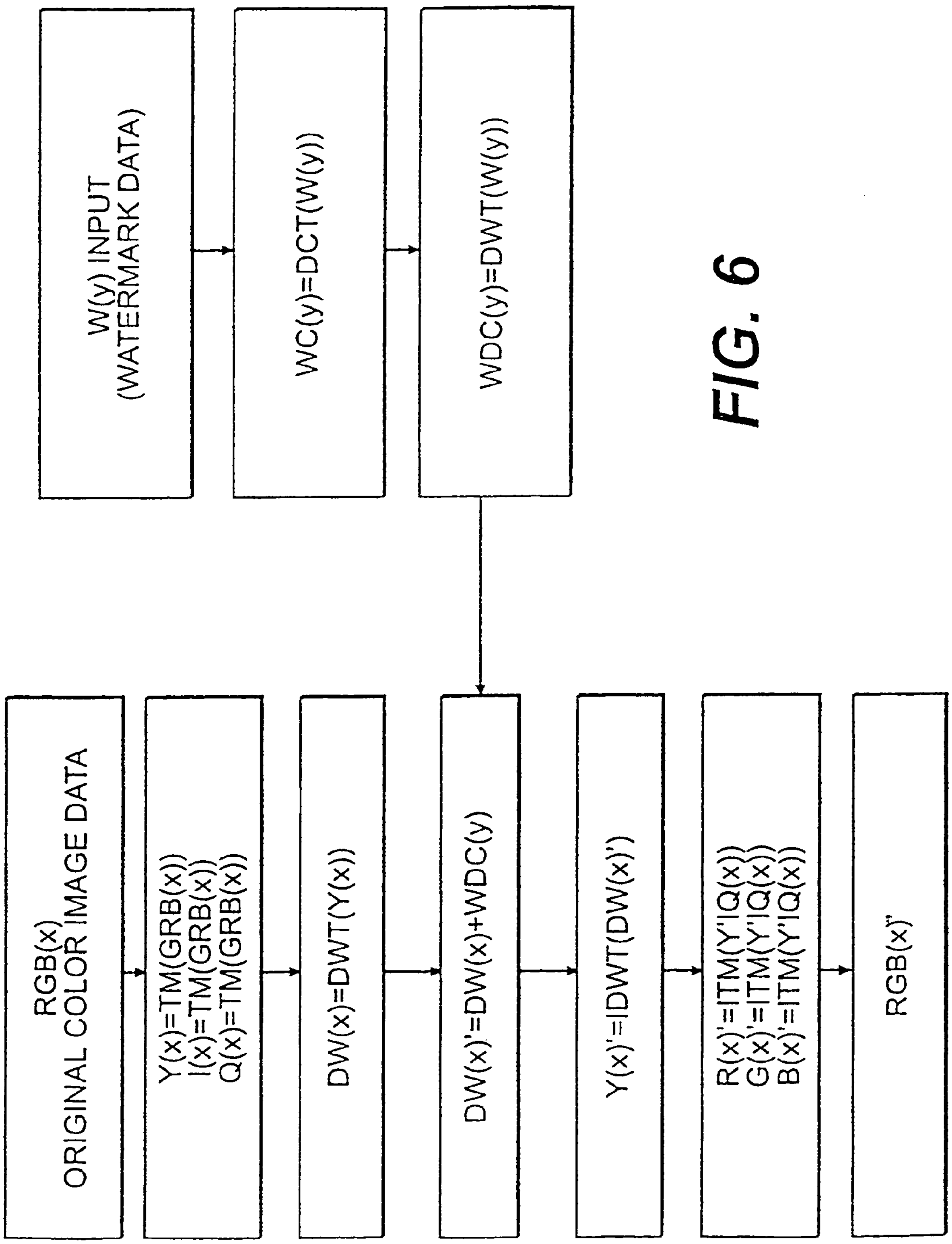
FIG. 6 is a flow diagram showing yet another embodiment of digital watermarking of a color image using WT and DCT.

Referring to FIG. 6, which shows an alternative schematic flow chart of watermarking a color image, the method includes the following steps of:

1), converting the color image data in the RGB mode, RGB(x), to Y(x), I(x) and Q(x) in the YIQ mode;

2), transforming the Y(x) using I-level wavelet transform;

3), transforming watermark data W(y) in black and white using DCT;

4), further transforming the DCT-transformed watermark using m-level discrete wavelet transformation;

5), integrating the wavelet transformed color image DW(x) with m-level wavelet-transformed watermark WDC(y);

6), transforming the integrated image DW(x)' using inverse wavelet transform to provide Y(x)'; and 7), generating a watermark-embedded image RGB(x)' by converting the image in the YIQ mode to that in the RGB mode.

When obtaining the color image RGB(x)' integrated with a watermark W(y), a scaling parameter α is used to adjust the spacing between the original image RGB(x) and the watermark W(y). The present invention uses the following for easy conversion.

$$RGB(x)'_i = RGB(x)_i + \alpha W(y)_i \quad \text{[Equation 7]}$$

For conversion from the RGB mode to YIQ mode, the conversion matrix and inverse conversion matrix are disclosed in the following literature. (See Janes F. Blinn "NTSC: Nice Technology, Superior Color", IEEE Computer Graphic & Applications, March 1993, pp. 17–23; James F. Blinn "The World of Digital Video", IEEE Computer Graphics & Applications, September 1992, pp. 106–112).

As mentioned above, the software was provided in the C code using Visual C++. An IBM PC of Pentium class was used to perform necessary calculations.

Experiments were conducted to test the robustness of the watermarks embedded in accordance with the present invention against the JPEG compression, filtering and cropping. The final results were judged to compare the strength of the watermarks using correlation analysis. The correlation is defined as follows:

$$C(\text{Correlation}) = \frac{W(i, j)}{\sqrt{W(i, i) * W(j, j)}} \quad \text{[Equation 8]}$$

In general, color images are compressed before being transmitted because uncompressed files such as a BMP file could be huge in size. Image compressions may be classified into lossy compressions and lossless compressions. Lossy compressions are widely used due to its high compression ratio despite minor degradation of an original image. JPEG is a representative example of a lossy compression. As mentioned above, since watermarks should be preserved after image processing, a watermarking method is commercially usable only if no problem occurs after a lossy compression.

EXAMPLE 6

Evaluation of Watermark Preservation After Lossy Compression of Color Images An experiment was conducted to test the preservation strength of watermarks by changing the Q factor of JPEG to 50%, 40%, 30%, and 20% 10%, and 5%. As a result, the watermarks after up to 5% JPEG compression were visually identifiable. The correlation of the watermarks extracted from the watermark-embedded image compressed by JPEG is shown in Table 4.

TABLE 4

| Q factor | 50% | 40% | 30% | 20% | 10% | 5% |
|---|---|---|---|---|---|---|
| Correlation | 63.41% | 45.48% | 51.82% | 62.42% | 61.41% | 62.36% |

Since color images typically go through filtering to eliminate the noise, an experiment was conducted to find out the effect on watermarks after a low-pass filter and a high-pass filter filter color images. The test confirmed that the watermarks could be successfully extracted. The correlation of a watermarks extracted is shown in Table 5.

TABLE 5

| Filter Type | Low Pass Filter | High Pass Filter |
|---|---|---|
| Correlation | 19.71% | 1.42% |

The result shows that the watermarks were not affected by the filtering through low-pass and high-pass filer. The correlation was somewhat low, but this would not pose a serious problem in extracting and recognizing a watermark.

EXAMPLE 7

Extraction of a Watermark After a Color Image is Converted From the RGB Mode to YIQ Mode There are many color image modes being used, such as the RGB mode, the CMY mode, the YIQ mode, and the HIS mode. An experiment was conducted to extract watermarks and measure correlation of those color images changed from the RGB mode to the YIQ mode. The test shows that the extracted watermarks could be clearly recognized despite low correlation values compared to the conventional RGB mode.

EXAMPLE 8

Effect on a Watermark After Cropping of an Image Block

An experiment was conducted to measure how much of a watermark remains at the center of a color image, the most essential part. An image block of 192×192 was truncated from the whole image, and the correlation was shown in Table 6.

TABLE 6

| | |
|---|---|
| Cropping Size | 192 × 192 |
| Correlation | 52.82% |

The result confirmed that successful extraction of a watermark is possible after cropping of an image block.

EXAMPLE 9

Evaluation of the Digital Watermarking Algorithm with a Letter

The watermark image used in evaluating of the digital watermarking algorithm was an image with a particular letter. Since the image has the form of an impulse, it is expected that the values after DCT transform be widely distributed. This lead to a similar result as spread spectrum. Uniformly distributed watermarks can be generated by inverse wavelet transform of the DCT-transformed watermark.

In conclusion, as shown above, the present invention of digital watermarking using wavelet transform (WT) and DCT has a superior ability of preserving watermarks after lossy compression or other image processing of a color image. Watermarks were preserved even after the color image was converted from the RGB mode into the YIQ mode. Especially, extraction of a watermark was possible after lossy compression of JPEG using the Q factor of 50%, 40%, 30%, 20%, and 5%. Extraction of watermarks was possible after the images were subject to low-pass filtering, high-pass filter, or image cropping. Therefore, the present invention was proved to be suitable for watermarking color images, which was not possible using the conventional techniques, as far as the present inventors are concerned.

While the invention has been described with reference to preferred embodiments, it is not intended to be limited to those embodiments. It will be appreciated by those of ordinary skill in the art that many modifications can be made to the structure and form of the described embodiments without departing from the spirit and scope of the invention, which is defined and limited only in the following claims.

What is claimed is:

1. A method of watermarking a digital image, comprising the steps of:

transforming the digital image using a wavelet transform (WT);

transforming a watermark using a discrete cosine transform (DCT); and integrating the DCT-transformed watermark with the wavelet-transformed image to generate a watermark-embedded image, wherein the DCT-transformed watermark is further transformed using m-level wavelet transform before being integrated with the wavelet-transformed image.

2. The method of claim 1, further comprising the step of inverse wavelet transforming the wavelet transformed image.

3. The method of claim 1, wherein said wavelet transform is performed using a filter bank realizing high-speed wavelet-transform.

4. The method of claim 1, wherein said wavelet transform is performed using a filter bank realizing high-speed wavelet-transform.

5. The method of claim 1, wherein in obtaining the image integrated with a watermark, a scaling parameter, α, is used to adjust the spacing between the original image and the watermark.

6. The method of claim 1, wherein the digital image and the watermark are black and white.

7. A system for watermarking a digital image comprising:

means for providing a digital image and a watermark; and a digital processing system for transforming the digital image using wavelet transform (WT), transforming the watermark using discrete cosine transform (DCT), and integrating the DCT-transformed watermark with the wavelet-transformed image to generate a watermark-embedded image;

means for carrying out digital watermarking a black and white image using the wavelet transform (WT) and the discrete cosine transform (DCT), wherein the watermark is black and white; and means for providing an m-level wavelet transform (WT) before the DCT-transformed watermark is integrated with the wavelet transformed image.

8. The system of claim 7, further comprising filter-banks for providing high-speed wavelet-transform and for providing inverse wavelet transform.

9. A method of digital watermarking a color image comprising the steps of:

discrete cosine transform (DCT) transforming a watermark, wavelet transform (WT) transforming a color image, and integrating the DCT-transformed watermark with wavelet transform (WT) color image, wherein the DCT-transformed watermark WC(y) is further transformed using m-level wavelet transform before being integrated with the wavelet-transformed color image DW(x).

10. A method of claim 9, further comprising the steps of:

converting the color image in the RGB mode, RGB(x), into Y(x), I(x), and Q(x) in the YIQ mode using a conversion matrix.

11. A method of claim 10, further comprising the steps of:

transforming Y(x) of the converted image using wavelet transform;

transforming a watermark, W(y), using discrete cosine transform (DCT);

integrating the DCT-transformed watermark, WC(y), with the wavelet-transformed color image, DW(x);

generating Y-values of the integrated image, Y(x)', using inverse wavelet transform; and generating a watermark-embedded image in the RGB mode, RGB(x)', by inverse transformation of Y(x)', I(x)', and Q(x)'.

12. The method of claim 9, wherein said wavelet transform is performed using filter-banks realizing high-speed wavelet-transform.

13. A system of digital watermarking a color image, comprising:

means for converting the color image in the RGB mode, RGB(x), into Y(x), I(x), and Q(x) in the YIQ mode using a conversion matrix;

means for transforming Y(x) of the converted image using wavelet transform;

means for transforming a watermark, W(y), using (DCT);

means for further transforming the DCT-transformed watermark WC(y) using m-level wavelet transform;

means for integrating the DCT-transformed watermark, WC(y), with the wavelet-transformed color image, DW(x);

means for generating Y-values of the integrated image, Y(x)', using inverse wavelet transform; and means for generating a watermark-embedded image in the RGB mode, RGB(x)', by inverse transformation of Y(x)', I(x)', and Q(x)'.

* * * * *